United States Patent
Henderson

(10) Patent No.: US 6,394,461 B1
(45) Date of Patent: May 28, 2002

(54) PRESSURE COMPENSATED STUFFING BOX FOR RECIPROCATING PUMPING UNITS

(76) Inventor: Tom Henderson, P.O. Box 253, Taft, CA (US) 93268

( * ) Notice: Subject to any disclaimer, the term of this patent is extended or adjusted under 35 U.S.C. 154(b) by 0 days.

(21) Appl. No.: 09/528,496

(22) Filed: Mar. 17, 2000

(51) Int. Cl.$^7$ .............................. E21B 33/06; F16J 15/18
(52) U.S. Cl. ...................... 277/327; 277/330; 277/329; 277/513; 277/514
(58) Field of Search .................................. 277/324, 327, 277/330, 329, 328, 513, 514, 522, 928; 166/84.1, 84.2

(56) References Cited

U.S. PATENT DOCUMENTS

| | | | |
|---|---|---|---|
| 1,947,198 A | * 2/1934 | Goble | 277/327 |
| 1,959,984 A | 5/1934 | Miller | |
| 2,069,443 A | * 2/1937 | Hill | 277/327 |
| 3,395,923 A | 8/1968 | Remke et al. | |
| 3,614,111 A | * 10/1971 | Regan | 277/324 |
| 3,967,678 A | 7/1976 | Blackwell | |
| 4,828,024 A | 5/1989 | Roche | |
| 4,945,724 A | * 8/1990 | O'neal | 277/513 |
| 5,343,944 A | 9/1994 | Bassinger | |
| 5,540,283 A | * 7/1996 | Hahn | 166/379 |
| 5,615,736 A | 4/1997 | Reed | |
| 5,636,688 A | 6/1997 | Bassinger | |
| 5,988,282 A | 11/1999 | Jennings et al | |

* cited by examiner

Primary Examiner—Anthony Knight
Assistant Examiner—E. Peavey
(74) Attorney, Agent, or Firm—Nixon Peabody LLP; David S. Safran

(57) ABSTRACT

A packing arrangement for a reciprocating pumps, particularly oil well pumps, in which a stuffing box housing contains a pressure chamber, packing seals mounted within the pressure chamber, a pump rod extending through the housing and the packing seals within said pressure chamber in a manner permitting reciprocation of the rod, utilizes pressure amplification feature by which tubing pressure is amplified in an appropriate ratio and applied to the packing seals to insure that they are correctly compressed at all times without producing a binding of the packing seals with the pump rod. Furthermore, the stuffing box is mounted to the well head in a manner which permits a floating self-alignment upon loosening of a few bolts. Additionally, a venturi connection is provided which flushes the underside of the packing area so as to keep it free and clear of debris buildup.

8 Claims, 1 Drawing Sheet

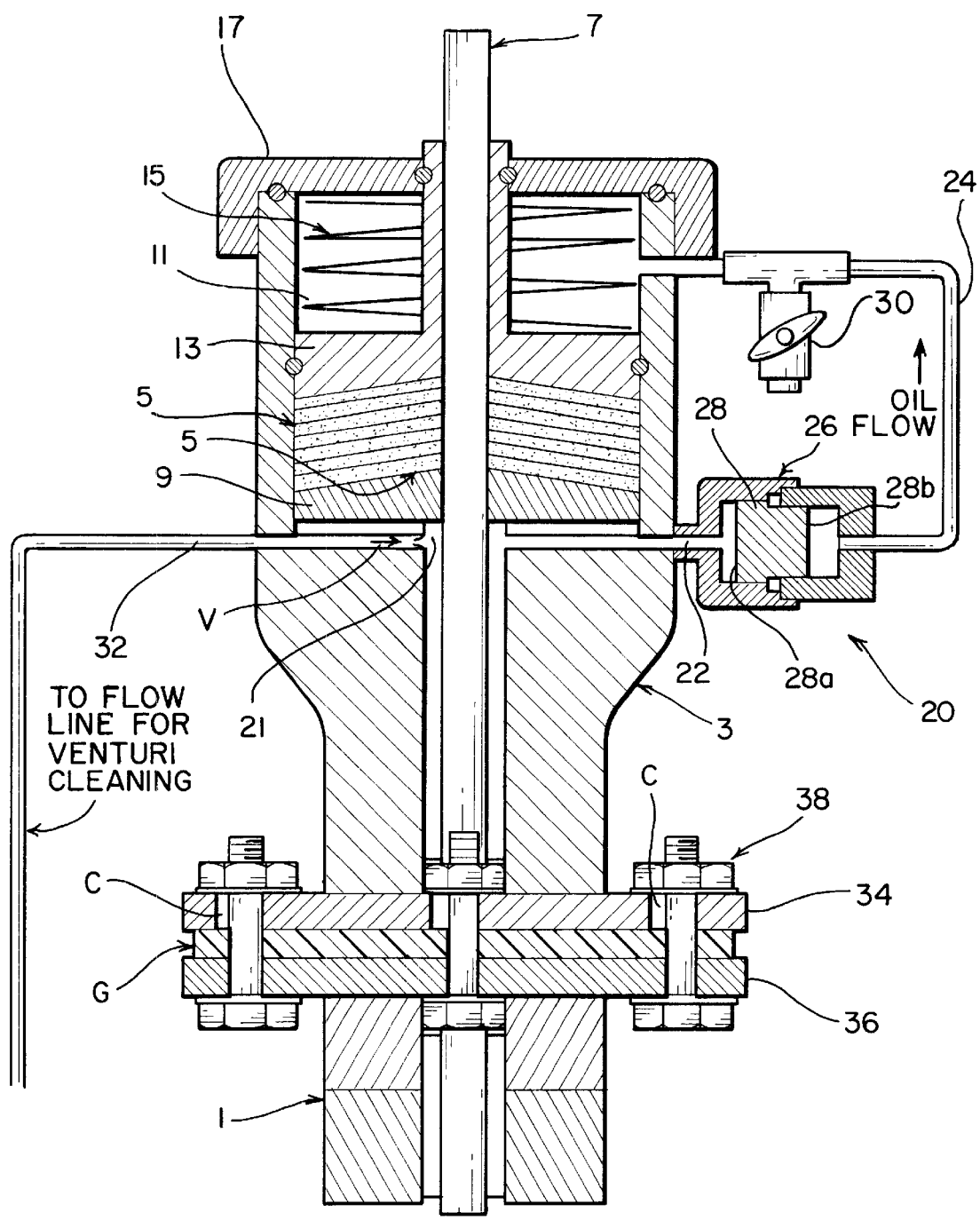

PRESSURE COMPENSATED STUFFING BOX FOR RECIPROCATING PUMPING UNITS

BACKGROUND OF THE INVENTION

1. Field of the Invention

The present invention relates to stuffing boxes for reciprocating pumping units having packing seals through which a polish rod reciprocates in a sealed relationship. In particular, the present invention relates to arrangements for minimizing and compensating for wearing of the packing seals in such stuffing boxes, especially in the oil well pumping context.

2. Description of Related Art

Typically, oilfield pumping units have a stuffing box through which a polish rod reciprocates in a sealed relationship and to which a string of sucker rods is connected for operating a downhole pump. The stuffing box seals wear with usage and must be replaced before they wear to the point that crude oil leaks from the stuffing box contaminating the surroundings. Stuffing box seal wear can result from a number of factors such as misalignment of the polish rod, friction between the rod and packing and the effects of particle buildup in the area underneath the packing. In the past, some packing had to be changed as frequently as every day and rarely longer than every two weeks. Thus, significant savings can be had if the life of the stuffing box packing could be significantly extended.

Thus, various techniques have been developed in an attempt to extend stuffing box packing life by minimizing wear-inducing factors. For example, U.S. Pat. No. 3,395,923 discloses a self-lubricating stuffing box in which an oil reservoir receives a small portion of the oil being pumped so as to maintain an oil layer between the packing rings. However, abrasives are still free to collect below the packing unit where they can score and frictional wear the polish rod and be drawn up into the packing.

U.S. Pat. Nos. 5,636,688 and 5,343,944 show self aligning stuffing boxes having a seal assembly which is able to move radially within the main body of the stuffing box to align the polish rod with the production tubing of the wellhead. However, the o-ring seals on the movable end surfaces present their own potential failure site. More importantly, because this arrangement only permits seal assembly which is able to move radially within the main body of the stuffing box to align the polish rod the problem of rubbing between the polish rod and the packing seals and/or on the stuffing box still exists.

It has also been known to use gas pressure built up in the tubing of an oil well as a force acting to compress the packing in a stuffing box; see, U.S. Pat. No. 1,959,984. However, no provision was made control the pressure applied to the packing, and in particular, because there was no mechanism for amplification of the applied pressure in any manner, packing utilization could not be optimized. Moreover, the design of the seal arrangement of this patent, in which wedge-shaped seals are repeated stressed and relaxed, itself contributes to wearing of the seals as the wedge-shaped seals are rubbed against each other.

Thus, there is still a need for an effective means for preventing premature wearing of packing seals due to misalignment, inadequate or improper pressurization of the seals, and the effects of debris accumulations so that the packing seals will not have to be changed as often as is currently the case and so as to minimize the danger of leakage into the environment.

SUMMARY OF THE INVENTION

It is a primary object of the present invention to provide a stuffing box with a pressure compensated packing which will insure that the seals are always properly adjusted.

It is a further object of the present invention to prevent shortening of the packing life due to misalignment of the polish rod.

Yet another object of the invention is prevent impregnation of the packing seals and scoring of the polish rod due to debris buildup under the packing.

A still further object of the invention is enable the foregoing objects to be achieved in a manner which does not require a substantially new type of stuffing box but rather will be amenable to implementation on existing types of stuffing boxes via relatively minor modifications.

These objects and others are achieved in accordance with the present invention by the implementation of a pressure amplification feature by which tubing pressure is amplified in an appropriate ratio and applied to the packing seals to insure that they are correctly compressed at all times without producing a binding of the packing seals with the polish rod. Furthermore, the stuffing box is mounted to the well head in a manner which permits a floating self-alignment upon loosening of a few bolts. Still further, a venturi connection is provided which flushes the underside of the packing area so as to keep it free and clear of debris buildup.

Other objects and features of the invention will become apparent from the following detailed description when viewed in conjunction with the accompanying drawing.

BRIEF DESCRIPTION OF THE DRAWINGS

The sole FIGURE of the drawings is a longitudinal cross-sectional view of an oil well equipped with a stuffing box in accordance with the present invention.

DETAILED DESCRIPTION OF THE INVENTION

The FIGURE shows a wellhead 1 equipped with a stuffing box 3 containing packing seals 5 and through which a polish rod shaft 7 extends. The packing seals 5 are supported on the well fluid side by a support plate 9 within a pressure chamber 11, and are engaged on an opposite side by a pressurizing piston 13 under an initial pre-loading applied by a compression spring 15 which is held in position by a cap 17 that is threaded onto the top end of the stuffing box 3, o-ring seals being provided between the stuffing box 3 and the top cap 17 and between the stuffing box 3 and the pressurizing piston 13. The polish rod shaft 7 extends through the cap 17, the pressurizing piston 13, the packing seals 5 and the support plate 9 in a manner permitting reciprocation of the polish rod.

A packing seal pressurizing system 20 is provided for applying a compaction force to to the packing seals 5, via the pressurizing piston 13, which is proportional to fluid pressure produced by reciprocating action of said pump rod, i.e., the well fluid in the bore 21 surrounding the polish rod shaft 7 below the support plate 9. The pressurizing system 20 is formed of a first flow line 22 which fluidically communicates with the well fluid which is at the pumping pressure, a second flow line 24 which fluidically communicates with the pressure chamber 11 and a pressure amplifier 26 that is located between said first and second flow lines 22, 24. The pressure amplifier produces a pressure in the second flow line 24 which is greater than said well fluid pressure by a predetermined multiple that is determined based on the requirements for the particular seals used. This pressure amplification is produce by piston 28 which has a first face 28a that is exposed to the pressure in the first flow line 22 and a second face that is exposed to the fluid in the second flow line 24, the piston faces 28a, 28b having areas of a size differential corresponding to the pressure increase factor to be produced. An inlet valve connection is provided in line 24 to enable initial evacuation of the line 24 and pressure chamber 11, and then filling thereof with oil.

With this arrangement, at start-up of the pumping operation, only the pre-load applied by the spring 15, e.g., 30 pounds, acts on the pressurizing piston 13. Thus, sufficient pressure is applied to the packing seals 5 to prevent leakage, yet not so much pressure is applied as would cause binding of the seals 5 against the polish rod shaft 7. However, once in operation, the well fluid pressure builds up to around 100 pounds and the spring 15 ceases to be effective, the function of applying sufficient force to the packing seals 5 to prevent leakage then being assumed by the oil in line 24 and in pressure chamber 11 which is an amplified function of the well fluid pressure due to difference in the sizes of the piston faces 28a, 28b, rising and falling with the well pressure. Once the pumping operation is stopped, well fluid pressure drops and the spring 15 takes effect again.

To insure that debris does not build up under the support plate 9, which can scar the polish rod shaft 7 and can work its way into the packing seals 5, a clean-out arrangement is provided. In particular, a cleaning flow line 32 extends from the area where the polish rod shaft 7 emerges from the support plate 9. The cleaning flow line 32 has a venturi v at an inlet end thereof. The venturi v creates a pressure drop that results in a siphoning flow for drawing fluid and the debris therein from area below the support plate 9.

In addition, since the stuffing box for oilfield pumping units are never aligned perfectly when installed due to unevenness of the concrete pads, and a ⅛ to ¼ inch misalignment will cause the packing sea aligning the stuffing box 3 relative to said polish rod 7. This alignment means comprising a mounting flange 34 on the stuffing box 3, abase flange 36 on the wellhead and a plurality of bolts 38 which extend through holes in each of the flanges 34,36. The shaft of the bolts 38 fit snuggly in the holes in the base flange 36 and with a radial clearance C in the holes in the mounting flange 34 of the housing, e.g., a ¾" hole in the base flange 36 and a 1 ¼ hole in the stuffing box mounting flange 34. In this way, with the bolts loosened, up to a ½ displacement of the stuffing box 3 relative to the base flange 36 is obtainable for releasing side thrust between the polish rod shaft 7 and the packing seals 5. In this regard, it is noted that the side thrust applied by the polish rod shaft 7 to the packing seals 5 will produce the requisite alignment movement. When the bolts are tightened down, the flanges 34, 36 are compressed against a gasket G, insuring a leak-free junction and will prevent shift of the stuffing box once aligned.

While only a single embodiment in accordance with the present invention have been shown and described, it is understood that the invention is not limited thereto, and is susceptible to numerous changes and modifications as known to those skilled in the art. Furthermore, while the illustrated embodiment is a stuffing box for an oilfield well, the present invention, particularly the pressure compensation feature, is applicable to all types of reciprocating pumps, horizontal as well as vertical. Therefore, this invention is not limited to the details shown and described herein, and includes all such changes and modifications as are encompassed by the scope of the appended claims.

What I claim is:

1. A pressure compensated packing arrangement for a reciprocating pump comprising a housing containing a pressure chamber, packing seals mounted within said pressure chamber, a pump rod extending through said housing and the packing seals within said pressure chamber in permitting reciprocation of said rod, a packing seal pressurizing system applying a compaction force to said packing seals which is proportional to fluid pressure produced by reciprocating action of said pump rod, said pressurizing system a first flow line fluidically communicating with fluid at said fluid pressure, a second flow line fluidically communicating with said pressure chamber and a pressure amplifier located between said first and second flow lines, said pressure amplifier producing a pressure in said second flow line which is greater than said fluid pressure by a predetermined multiple.

2. A pressure compensated packing arrangement according to claim 1, further comprising a spring and a pressurizing plunger in said pressure chamber, said pressurizing plunger transferring a pre-loading force to said packing seals from said spring.

3. A pressure compensated packing arrangement according to claim 2, wherein said pressure amplifier comprises a piston having a first face exposed to the pressure in said first flow line and a second face exposed to the fluid in said second flow line, said faces having areas of a size differential corresponding to the pressure increase factor to be produced.

4. A pressure compensated packing arrangement according to claim 1, wherein said pressure amplifier comprises a piston having a first face exposed to the pressure in said first flow line and a second face exposed to the fluid in said second flow line.

5. A pressure compensated packing arrangement according to claim 1, further comprising a cleaning flow line extending from an area where said pump rod emerges from said pressure chamber and fluidically communicating with fluid in said area, said cleaning flow line containing a venturi at an inlet end thereof for drawing fluid and debris therein from said area.

6. A pressure compensated packing arrangement according to claim 1, further comprising alignment means for aligning said housing relative to said pump rod, said alignment means comprising a mounting flange on said housing, a base flange and a plurality of bolts extending through holes in each of said flanges, said bolts fitting snuggly in the holes in the base flange and with radial clearance through the holes in the mounting flange of the housing, thereby permitting displacement of said housing relative to said base flange releasing side thrust between the rod and the packing seals.

7. A pressure compensated packing arrangement according to claim 6, wherein said base flange is on a top end of a well head and said rod is a polish rod of an oil well.

8. A packing arrangement for a reciprocating pump comprising a housing containing a pressure chamber, packing seals mounted within said pressure chamber, a pump rod extending through said housing and the packing seals within said pressure chamber in permitting reciprocation of said rod, and a cleaning flow line extending from an area where said pump rod emerges from said pressure chamber and fluidically communicating with fluid in said area, said cleaning flow line containing a venturi at an inlet end thereof for drawing fluid and debris therein from said area.

* * * * *